H. Purdy,

Ageing Liquors.

No. 108,388. Patented Oct. 18, 1870.

Witnesses
R. T. Campbell

Inventor
Hiram Purdy
by
Munn, Fenwick & Lawrence

United States Patent Office.

HIRAM PURDY, OF BURLINGTON, IOWA.

Letters Patent No. 108,388, dated October 18, 1870.

IMPROVEMENT IN AGING ALCOHOLIC LIQUORS.

The Schedule referred to in these Letters Patent and making part of the same

*To all whom it may concern:*

Be it known that I, HIRAM PURDY, of Burlington, in the county of Des Moines and State of Iowa, have invented a new and improved Method of Aging Liquors; and I do hereby declare that the following is a full, clear, and exact description thereof, reference being had to the accompanying drawing making part of this specification, in which—

Similar letters of reference indicate corresponding parts in the two figures.

This invention relates to a new and improved process for improving the quality of newly distilled spirits, and giving to it the same character and value as is obtained by long keeping.

The nature of my invention consists in effecting both the heating of the liquor and the oxygenizing of the same by one agent, viz., common air or oxygen gas, by applying the air or gas in a sufficient heated condition to raise the liquor to the proper temperature while it is passing through and oxygenizing it.

The following is a description of my improved process, and one form of apparatus which may be used in conducting this process.

In the accompanying drawing—

A represents a wooden vessel, containing a worm pipe, B, through which common air or oxygen is forced by means of a pump.

In passing through the worm-pipe B, the air is heated either by hot water in vessel A, or other means may be adopted for heating the air.

On leaving worm B, the air, which is heated to a temperature lower than the boiling point of proof spirits, say from 90° to 120° Fahrenheit, enters a coil of pipe, C, which lies on the bottom of a vessel, D, containing the liquor under treatment.

Figure 1:
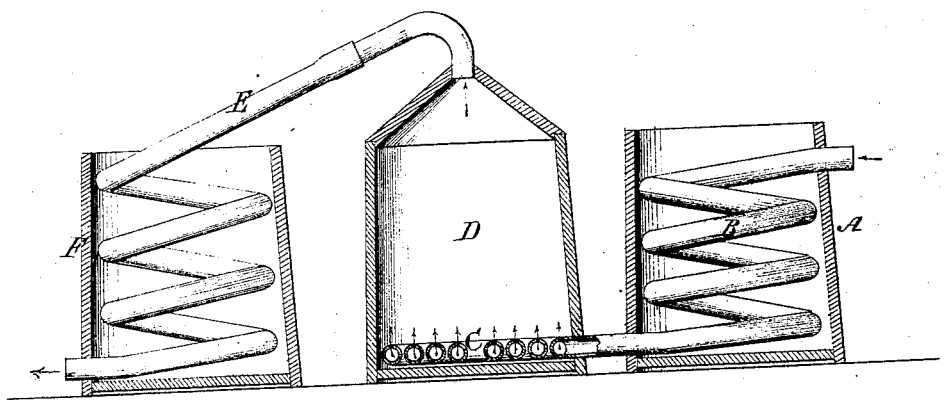
Figure 1 is a vertical section of the apparatus used in conducting the improved process of aging liquors.
Figure 2:
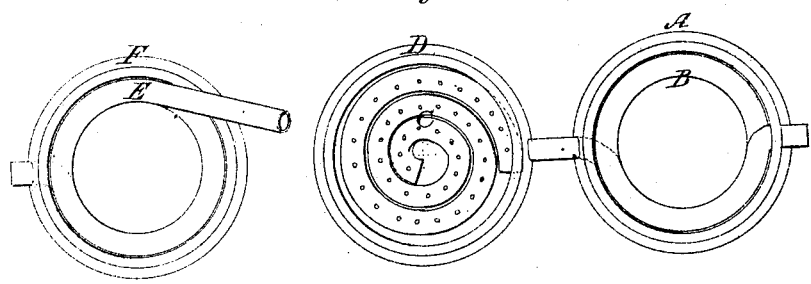
Figure 2 is a top view of the apparatus, parts of which are broken away.

This coil C is thickly perforated, and discharges the heated air in jets, which air rises through the body of the liquor to the top of the vessel D. The air thus conducted through the liquor will be more or less charged with alcoholic vapor. This is then conducted out of the top of vessel D into a condensing vessel, F, through the worm E, as indicated by arrows in fig. 1.

In the vessel F, cold water, or a cooling mixture is introduced, which will condense the alcoholic vapor, and the alcohol thus saved can be conducted back into the vessel D, in any convenient manner.

Instead of atmospheric air, a stream of pure oxygen may be forced through the worm B into the vessel D, and through the liquor therein. And from the outer end of the worm E in the vessel F, this oxygen may be brought a second time, through the force-pump, and thence through the liquor, and thus used over and over again until its virtues are mainly exhausted.

I am aware that the commingling of common air with spirits, or the exposure to air of alcoholic spirits for the purpose of aging the same is not new; but a great loss of alcohol has always been sustained in such cases by conducting the process in the open air, or by not providing for reclaiming the alcohol carried off in vapor.

The advantage of my process over others is, that the liquor is heated through the medium of the air, (or oxygen,) introduced into it, thus preventing the heating of any part of the body of liquor to a higher temperature than would be safe, or than that which is necessary to obtain the best results, viz., from 90° to 120° Fahrenheit.

Having described my invention, and without confining myself to the apparatus set forth,

What I claim as new, and desire to secure by Letters Patent, is—

The process for aging or improving liquors by commingling them thoroughly with heated air, (or with oxygen gas,) in a closed vessel, the air or gas serving to both heat and oxygenize the liquor, substantially as described.

HIRAM PURDY.

Witnesses:
W. J. POLLOCK,
GEO. C. LANMAN.